United States Patent [19]
Davis

[11] Patent Number: 5,606,233
[45] Date of Patent: Feb. 25, 1997

[54] SYSTEM FOR GENERATING ELECTRICITY IN A VEHICLE

[76] Inventor: James W. Davis, 277 Kavenish Dr. W., Rancho Mirage, Calif. 92270

[21] Appl. No.: 545,107

[22] Filed: Oct. 19, 1995

Related U.S. Application Data

[63] Continuation of Ser. No. 286,941, Aug. 8, 1994, abandoned.

[51] Int. Cl.$^6$ .................................................. H02P 5/20
[52] U.S. Cl. ........................ 318/142; 318/139; 318/149; 318/153; 180/65.3
[58] Field of Search .................................. 318/140–158, 318/139; 180/65.3, 65.1, 65.2, 65.4, 65.5, 65.8, 302–304

[56] References Cited

U.S. PATENT DOCUMENTS

| | | | |
|---|---|---|---|
| 4,115,634 | 8/1978 | Smith | 417/231 |
| 4,173,431 | 11/1979 | Smith | 417/229 |
| 4,632,205 | 12/1986 | Lewis | 120/165 |
| 4,753,078 | 6/1988 | Gardner, Jr. | 60/668 |
| 4,900,231 | 2/1990 | Kennedy | 417/16 |
| 5,123,239 | 6/1992 | Rodgers . | |
| 5,242,278 | 7/1993 | Vanderslice et al. | 417/364 |
| 5,296,799 | 3/1994 | Davis | 322/35 |

OTHER PUBLICATIONS

Article from Popular Mechanics Magazine—Feb. 1994—4 pages.
Article from Popular Science Magazine—Jan. 1994—7 pages.
Article form Cars & Parts Magazine—Sep. 1977—6 pages.
Article from Cars & Parts Magazine—Aug. 1977—5 pages.

*Primary Examiner*—David S. Martin
*Attorney, Agent, or Firm*—William G. Lane

[57] ABSTRACT

A system for generating electricity in a vehicle when the vehicle is not moving at a sufficient speed to drive the on board generators and when the wind is insufficient to drive the generators. In one embodiment, a control unit receives input signals from sensors which determine the vehicle speed and the speed and direction of the wind. In another embodiment, the control unit receives input signals from sensors which determine the total current produced by the generator. Based on these signals, the control unit controls the discharge of air from storage tanks on the vehicle to power the generators. The generators produce electricity which is stored on the vehicle and is used to run the vehicle.

3 Claims, 6 Drawing Sheets

5,606,233

1

SYSTEM FOR GENERATING ELECTRICITY IN A VEHICLE

This is a continuation of U. S. patent application Ser. No. 08/286941, filed Aug. 8, 1994 now abandoned.

BACKGROUND OF THE INVENTION

This invention relates to a system for generating electricity in an electric vehicle. More particularly, the invention pertains to a system for generating electricity in a vehicle when the vehicle is not moving and when there is no appreciable wind to drive the generators on board the vehicle.

Various prior arrangements have been provided for generating electricity for storage and use in powering a vehicle. Some such arrangements have utilized wind, or air flow which results when the vehicle is moving, to generate electricity. These arrangements, however, are not adapted to generate electricity when the wind direction and/or speed, or speed of the vehicle is insufficient.

It is, therefore, a principal object of this invention to provide an improved system for generating electricity in a vehicle which overcomes this problem.

It is a further object of this invention to provide an improved system for generating electricity in a vehicle which saves on the number and weight of batteries.

It is a still further object of this invention to provide an improved system for generating electricity in a vehicle which saves on the number and weight of batteries by using compressed air to power the generators when the wind or air flow resulting from movement of the vehicle is insufficient to power the generators. Only a few batteries are required rather than many.

SUMMARY OF THE INVENTION

A first embodiment of the invention is adapted to be embodied in a system for generating electricity in a vehicle which comprises an air powered generator for generating electricity and means, connected to the compressed air storing means, for discharging air from the compressed air storing means to operate the generator, only when the vehicle speed is below a first predetermined value and when the wind speed and direction is below a second predetermined value.

A second embodiment of the invention is adapted to be embodied in a system for generating electricity in a vehicle, comprising an air powered generator for generating electricity and means for storing compressed air on the vehicle. In accordance with this embodiment of the invention, the system further includes means, connected to the compressed air storing means, for discharging comprising an air powered generator for generating electricity and means for storing compressed air on the vehicle. In accordance with this second embodiment of the invention, the system further includes means, connected to the compressed air storing means, for discharging air from the compressed air storing means to operate the generator, only when the current produced by the generator is below a predetermined value.

2

Figure 2:
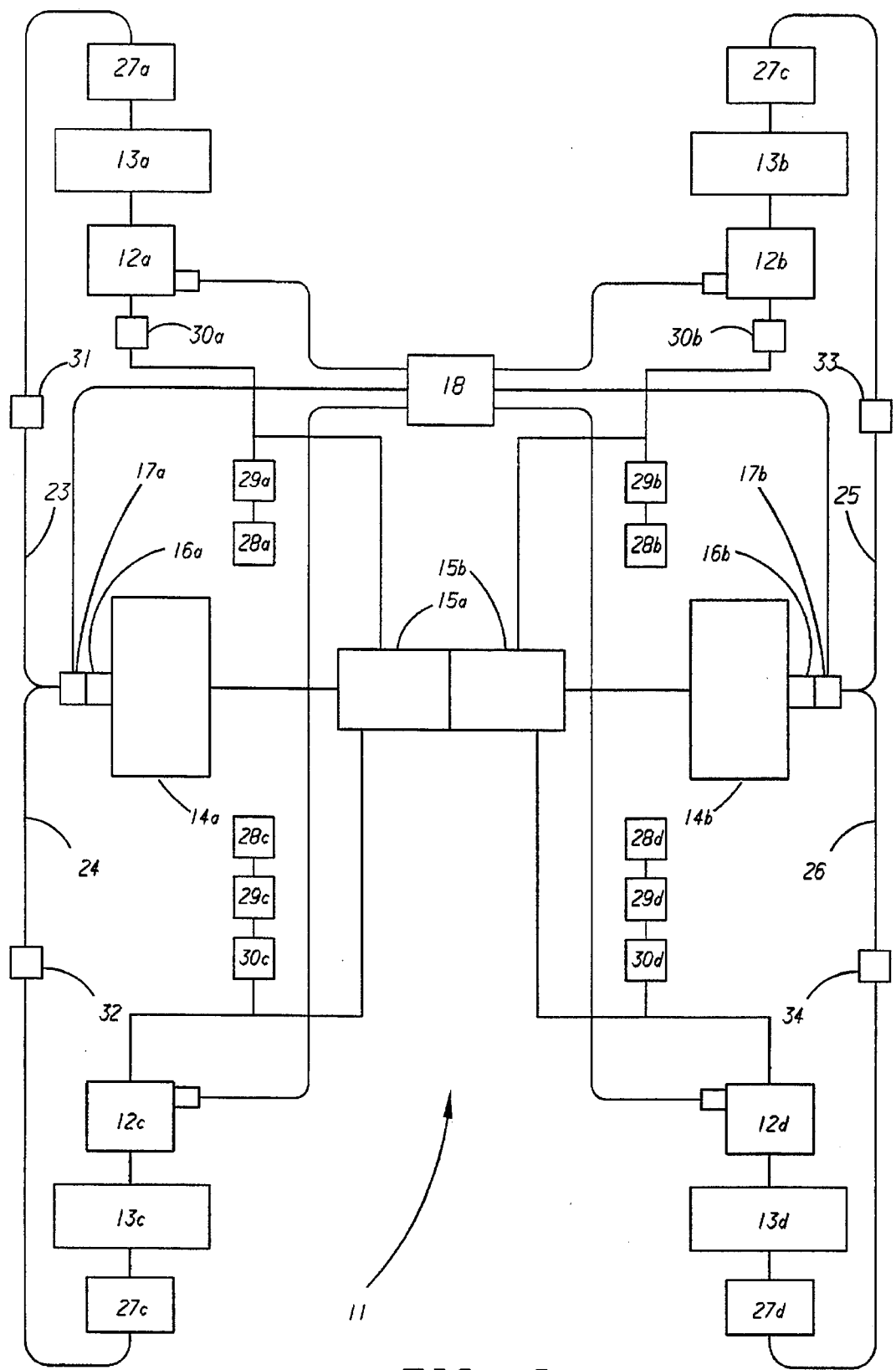

FIG. 2 is a schematic representation of the system of the present invention constructed in accordance with a second embodiment.

Figure 3:
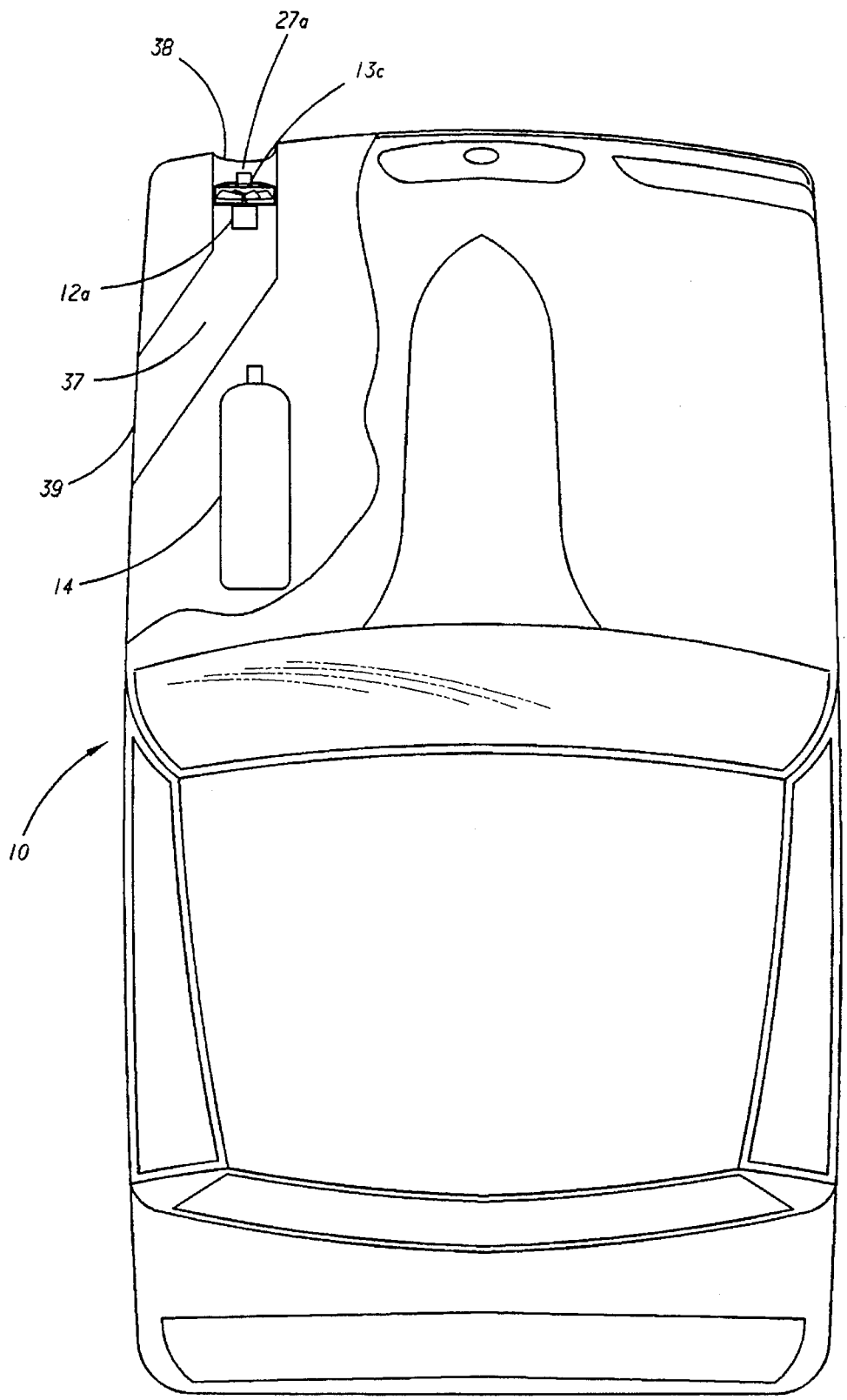

FIG. 3 is a top view of a vehicle with the upper left side cut away showing one of the generators and its associated components.

Figure 4:
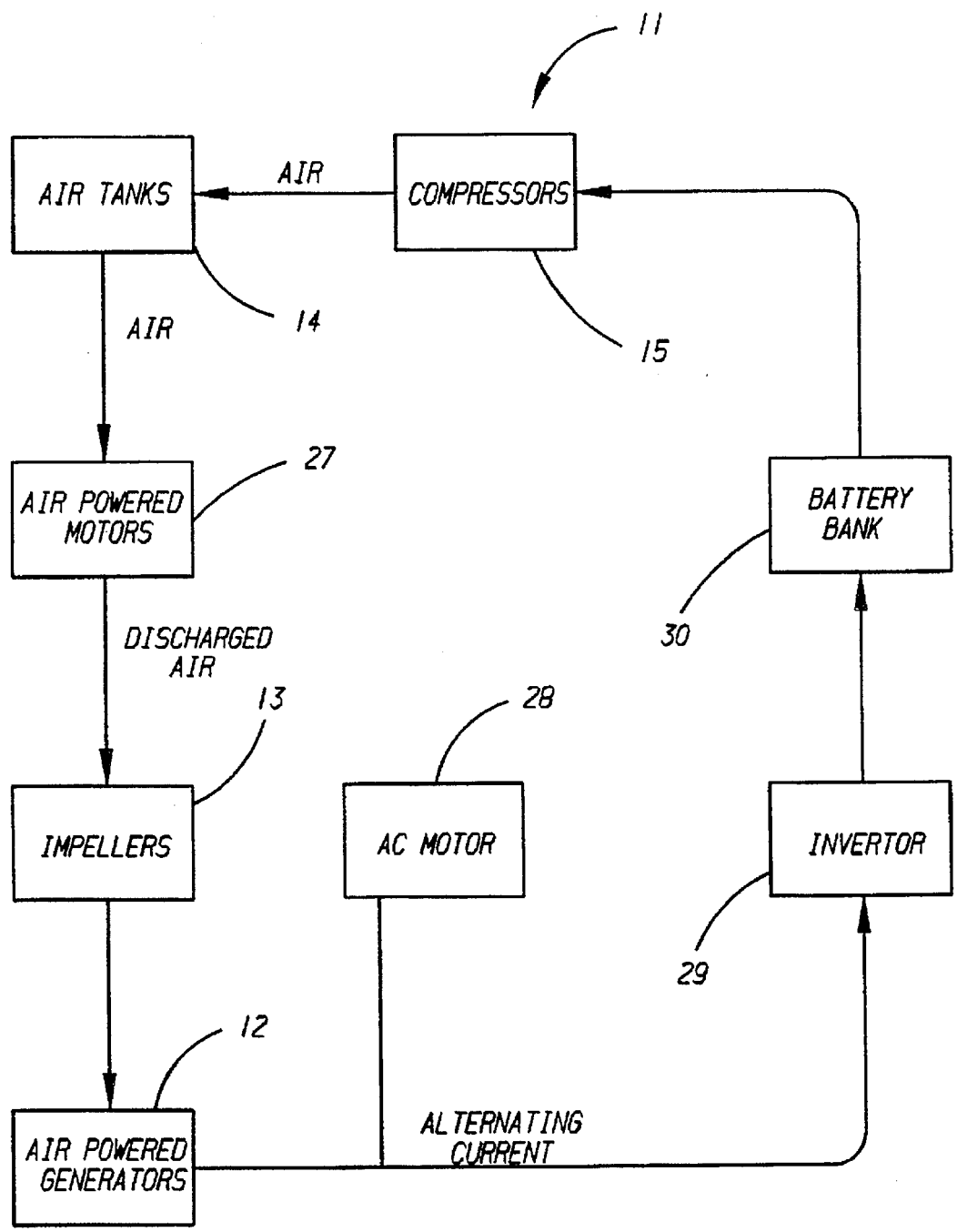

FIG. 4 is a block diagram of the system.

Figure 5:
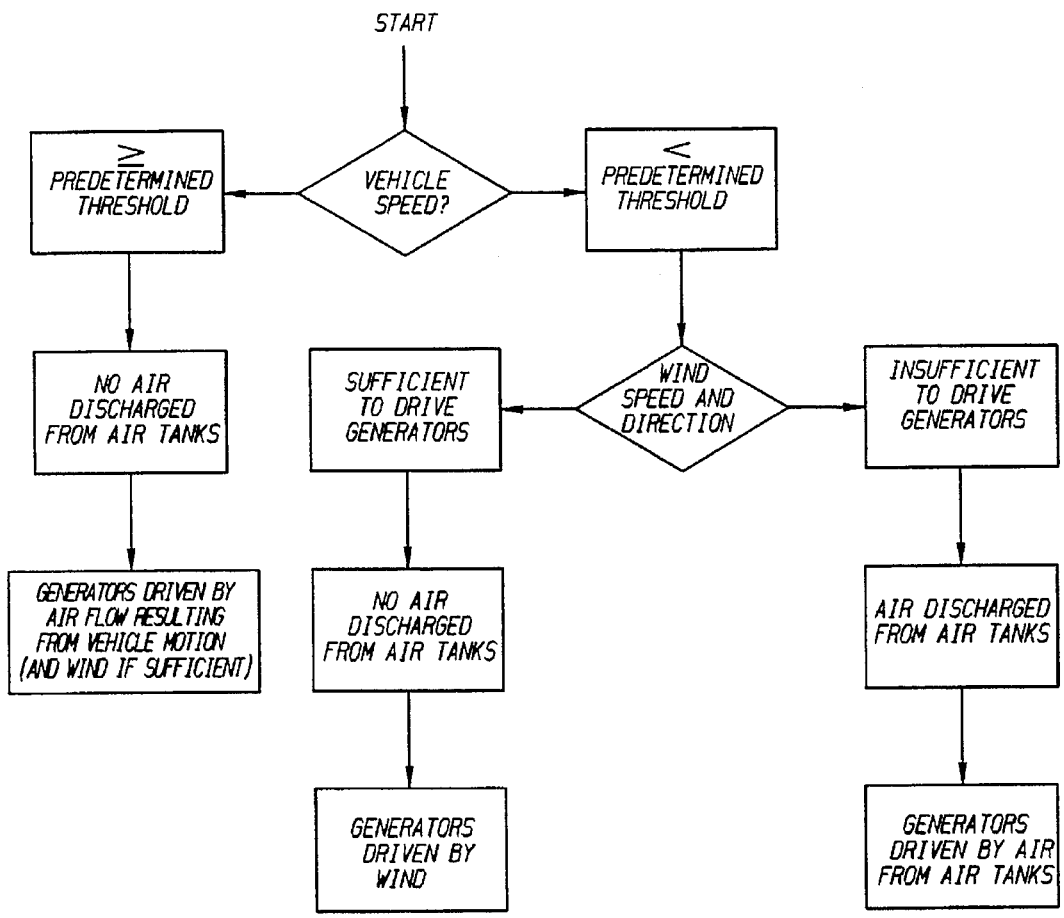

FIG. 5 is a flow diagram showing the operation of the system in accordance with the first embodiment of the invention.

Figure 6:
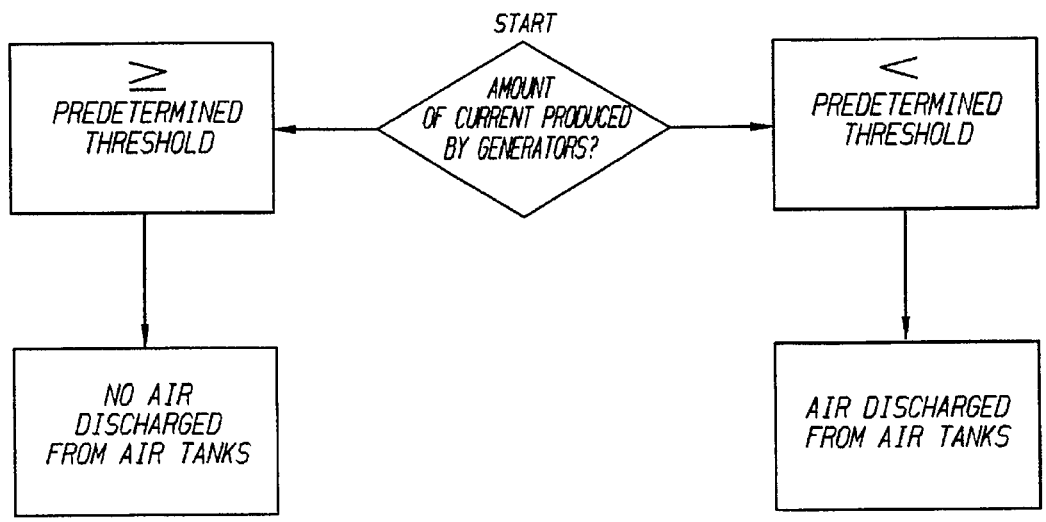

FIG. 6 is a flow diagram showing the operation of the system in accordance with the second embodiment of the invention.

Figure 7:
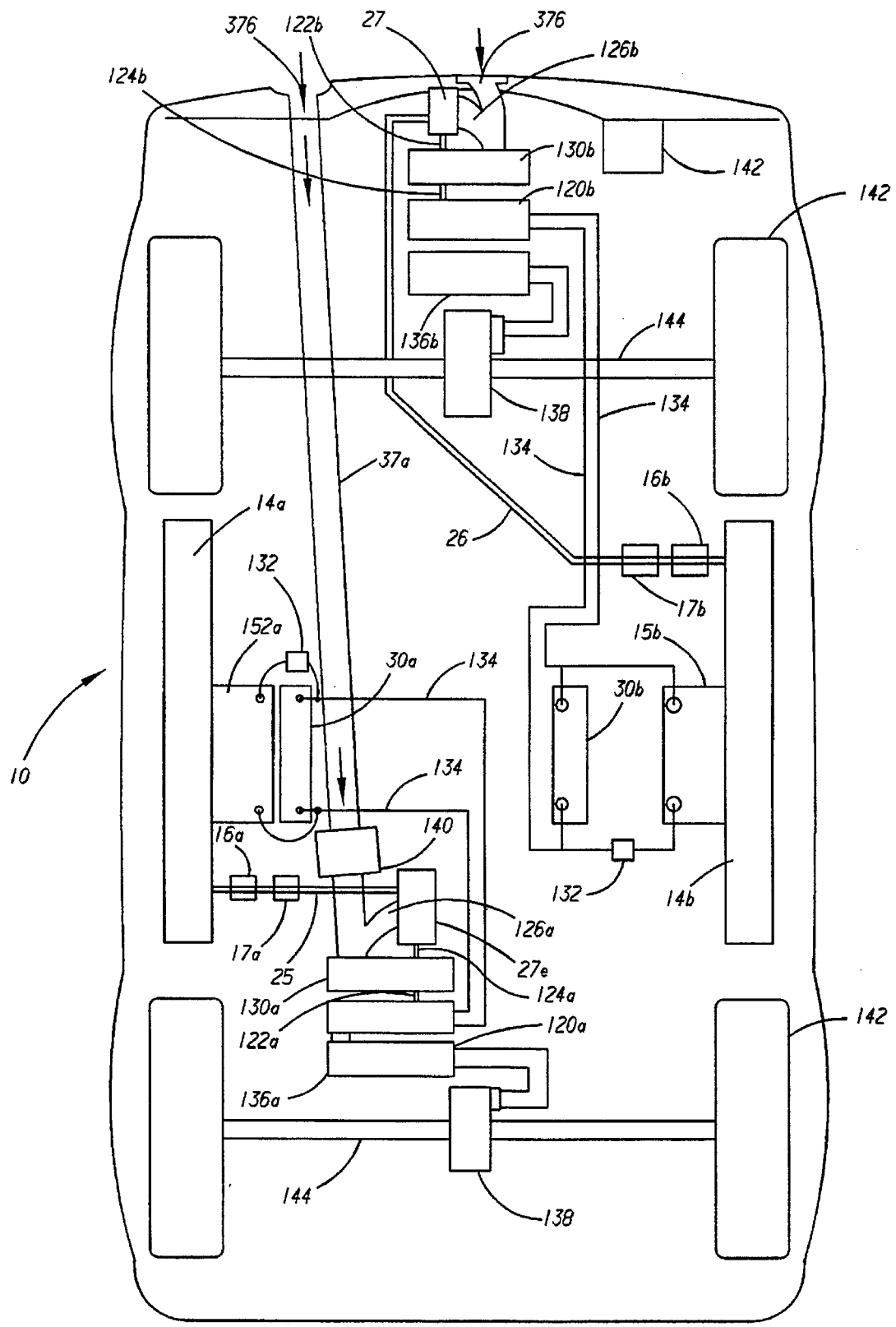

FIG. 7 is a top cutaway view of a vehicle showing installation of another embodiment of the invention.

DETAILED DESCRIPTION OF THE PREFERRED EMBODIMENTS OF THE INVENTION

Figure 1:
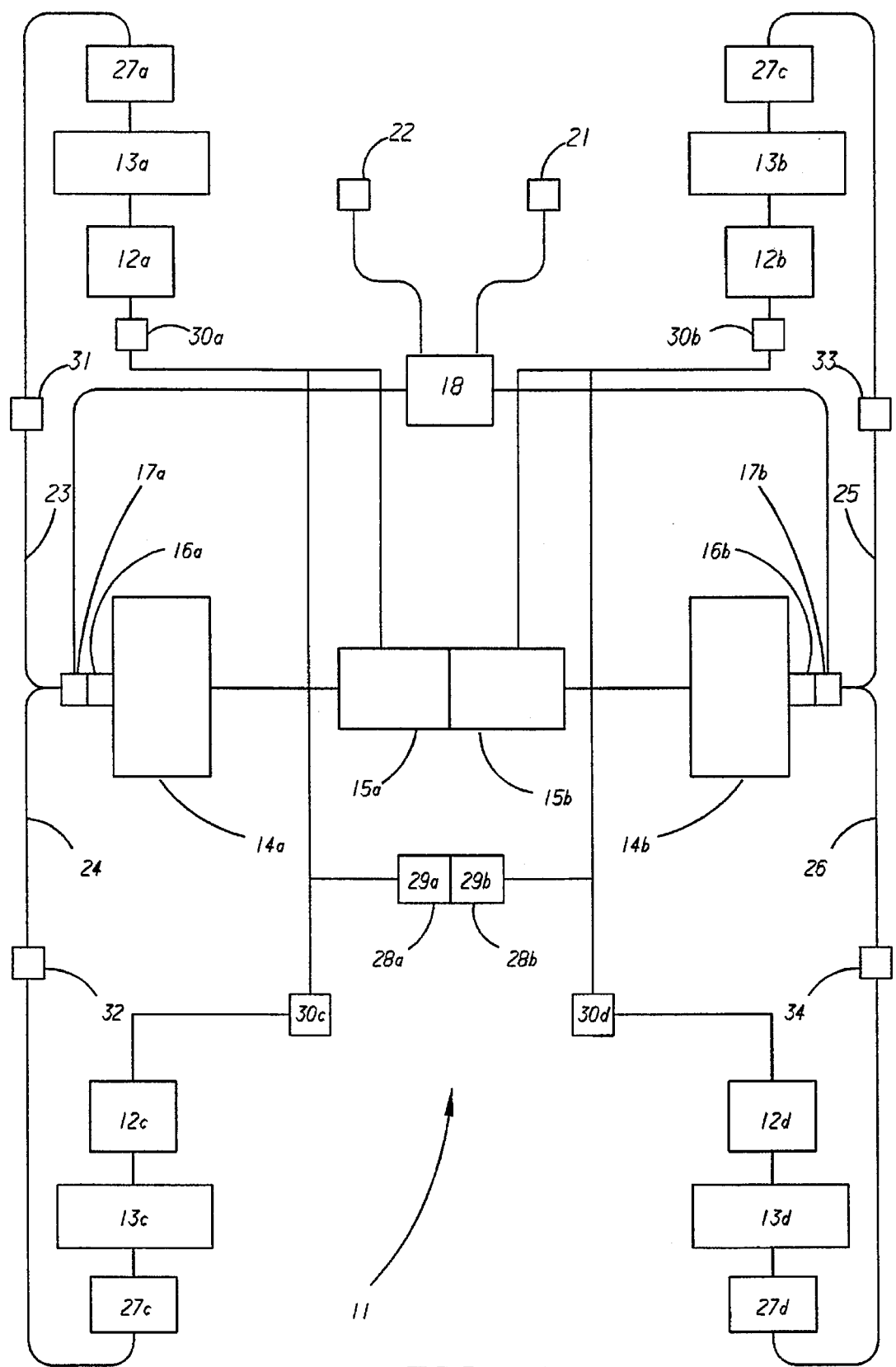
FIG. 1 is a schematic representation of the system of the present invention constructed in accordance with a first embodiment.

Referring first primarily to FIGS. 1 and 2, the system for generating and storing electricity is identified generally by the reference numeral 11. In accordance with the invention, the system 11 is incorporated on a vehicle for generating and storing electricity that is used to drive the vehicle. The system 11 may be incorporated into any known type and make of vehicle.

In the illustrated embodiments, the system is equipped with four air powered generators 12a, 12b, 12c and 12d, one on each side of the front of the vehicle and one on each side of the rear of the vehicle. Each generator supplies DC current to its individual battery bank 30a, 30b, 30c and 30d. The battery banks supply DC current to motor powered compressors 15a and 15b and inverters 29a and 29b. The inverters 20a and 29b supply AC current to AC motors 28a and 28b used to power the vehicle in the embodiment of FIG. 1. In the embodiment of FIG. 2, the battery banks supply electrical power to inverters 29a, 29b, 29c and 29d. The inverters supply AC current to the AC motors 28a, 28b, 28c and 28d. Each of the generators 12a, 12b, 12c and 12d has associated with it an impeller 13a, 13b, 13c and 13d respectively which is adapted to be driven by air flow resulting from movement of the vehicle, by an ambient prevailing wind blowing in its direction, and/or by air discharged from air tanks 14a and 14b on the vehicle under certain conditions as hereinafter described.

The system preferably includes at least two air tanks 14a and 14b mounted on, or formed integrally with, the frame of the vehicle. Each of the air tanks 14a and 14b has associated with it an electric motor powered compressor 15a and 15b respectively for compressing the air stored in the tanks of 14a and 14b. The motors for compressors 15a and 15b are preferably of the twelve volt type so as to be easily connectable with the vehicle's electrical system. However, other voltage systems can be employed. Each of the tanks 14a and 14b further includes a regulator 16a and 16b respectively and are automatically adjusted for controlling the discharge of air from the tanks 14a and 14b, as hereinafter described.

Each of the tank valves 17a and 17b is electrically connected to a control unit, identified generally by the reference numeral 18, which processes signals received from sensors. In the first embodiment shown in FIG. 1, a sensor 21 measures the motion of the vehicle 11 and a sensor 22 measures the speed and direction of the wind. When the control unit 18 and sensors 21 and 22 are on, the control unit 18 adjusts the valves 17a and 17b in response to the input signals received from the sensors 21 and 22. In the second embodiment illustrated in FIG. 2, sensors 19a, 19b, 19c and 19d are each operably connected to the corresponding generator 12a, 12b, 12c and 12d respectively for measuring the current produced by that generator. When the control unit 18 and sensors 19a, 19b, 19c and 19d are on, the control unit 18 adjusts the valves 17a and 17b in response to the input signals received from the sensors 19a, 19b, 19c and 19d. In either embodiment, the control unit 18 and sensors may be in circuit with the vehicle's ignition system so as to be turned on and off therewith.

In the illustrated first embodiment, the valves 17a and 17b are closed to prevent air from being discharged from the tanks 14a and 14b until the input signals from the sensors 21 and 22 indicate that the vehicle's speed has dropped below a certain threshold or predetermined value, and that the wind speed and direction is below a predetermined value such that there is insufficient wind to power any of the generators. In the illustrated second embodiment, the valves 17a and 17b are closed to prevent air from being discharged from the tanks 14a and 14b until the input from the sensors 19a, 19b, 19c and 19d indicate that the total current produced by the generators is below a certain threshold.

In either of the illustrated embodiments, when the sensor signals so indicate, the control unit 18 transmits electrical signals to the valves 17a and 17b to open them to discharge air from the tanks 14a and 14b. The valves 17a and 17b may be controlled so as to supply just the amount needed to drive the generators to produce a predetermined amount of electrical energy.

Other control schemes may be used as well for selectively effecting the discharge of air from the tanks 14a and 14b only when the vehicle speed and wind are insufficient to power the generators or when the generators are collectively not producing sufficient current, as will be appreciated by those skilled in the art.

In the illustrated embodiments, the air from tank 14a is discharged through regulator 16a and valve 17a into conduits 23 and 24, each of which is connected at its other end to an air powered motor, 27a and 27b respectively. If four air tanks are employed, each generator could be associated with its own air tank. A pressure reducer, 31, 32, 33 and 34 is preferably operably connected to each of the conduits 23, 24, 25 and 26 respectively between the corresponding tank 14a or 14b and the corresponding motor.

Referring now to FIG. 3, in addition to FIGS. 1 and 2, a top view of a vehicle 10 with the front left side cut away to show generator 12a, its associated components and air tank 14a. The air powered motor 27a is positioned upstream of the impeller 13a which, in turn, is positioned upstream of the generator 12a; all these components are positioned in air duct 37 which has an air intake 38 and an air discharge 39. The motor 27a, impeller 13a and generator 12a are connected by a shaft. The air tank supplies pressurized air to the air powered motor via air lines, valves and regulators (not shown) as described hereinafter.

Referring now to FIG. 4, the system is illustrated in block diagram form. The system has two stages to maximize utilization of the discharged compressed air. Air discharged from the tanks 14 is delivered to the air powered motors which are driven by the high velocity of the discharged air. Each of the motors, in turn, rotates a corresponding shaft (see FIG. 7) which drives the corresponding generator 12. Preferably, at least some of the exhaust air from the motors 27 passes through at a lower velocity into the impellers 13 to drive them which, in turn, also drive the generators via shafts to produce direct current which is supplied to the vehicle AC motors 27 via the inverter 29 which converts the direct current to alternating current. The battery bank forms a part of the vehicle's electrical system and supplies current to the compressors 15 and other auto accessories, such as lights, radio, etc. Alternatively, the vehicle can be powered with DC motors. The current for DC motors is supplied directly from the generators. Inverters are not required.

FIG. 5 illustrates the operation of the first embodiment of the present invention in flow diagram form. Initially, the speed of the vehicle is determined by the sensor 21. If the control unit 18 determines that the speed of the vehicle is less than a certain threshold or predetermined value, then the control unit 18 analyzes the sensory input from the sensor 22. If the control unit 18 determines that the wind speed and direction is below a certain threshold or predetermined value and is insufficient to drive the generators 12, the valves 17 on the air tanks 14 are automatically adjusted so that air is discharged from the tanks 14 to drive the generators 12 for generating electricity. On the other hand, if the control unit 18 determines that the wind speed and direction is above the threshold or predetermined value such that the wind is sufficient to drive the generators 12, the tank valves 17 are maintained closed so that no air is discharged from the tanks 14. In that case, the generators 12 are driven by the wind. Returning to the junction where the vehicle speed is determined, if such speed is determined to be greater than or equal to the threshold or predetermined value, then tank valves 17 are maintained closed so no air is discharged from the tanks 14. In that case, the generators 12 are driven by the air flow which results from the motion of the vehicle 11, and the wind if sufficient.

FIG. 6 illustrates the operation of the second embodiment of the present invention in flow diagram form. In this second embodiment, it is the collective production of current by the generators 12, 12b, 12c and 12d which determines whether or not air is discharged from the air tanks 14a and 14b, and if discharged, how much. As long as the current produced by all of the generators is greater than or equal to a certain predetermined value, then no air is discharged from the air tanks 14a and 14b. However, once the collective current produced falls below that value, air is discharged from the air tanks to power the generators.

Referring to FIG. 7, a cutaway view of a vehicle 10 is shown. In this embodiment, the battery is used to power compressors to charge air tanks. The compressed air in the tanks is used as needed to power air driven generators to produce current for the vehicle AC motors.

The vehicle has air tanks 14a and 14b, electric motor powered compressors 15a and 15b connected to the air tanks, and battery banks 30a and 30b electrically connected to the compressors' motors. Electrical power from the battery banks to the compressors' motors is controlled by on/off switch 132 which is controlled by a control unit (not shown) such as control unit 18 of FIGS. 1 and 2. Pressurized air is supplied from the air tanks to air motors 27e and 27f by conduit 25. The air pressure is regulated by regulator 16a and 16b and the volume of air is controlled by proportioning valves 17a and 17b which are controlled by the control unit. The air motors are connected in line with impellers 130a and 130b and generators 120a and 120b by shafts 124a and 124b and 122a and 122b. Wind is supplied to the impellers via air ducts 37a and 37b. The wind is natural wind and/or the wind resulting from the vehicles motion. The discharge air from the air motors is also supplied to the air duct via air discharge duct 126a and 126b to drive the impeller. The air motor and impeller power the generators to produce DC current.

The DC current produced by the generators is supplied to the battery bank and DC/AC converters and AC motor controllers (shown as a combined unit) 136a and 136b. The electrical output of the generators is controlled by the control unit. When the vehicle is being operated, the control unit senses that the AC motor controller is supplying AC current to the AC Motors 138a and 138b. The control unit directs the current from the generators to the power needs of the AC motors. Excess current from the generators is passed directly to the battery banks.

The AC motors are connected to the vehicle's wheels 142 by drive shafts 144. Preferably the AC motors output will by geared down by a conventional transmission or gear box (not shown). The wheels on the front of the vehicle are steerable. The speed of the AC motors is controlled by the AC motor controller which is controlled by the vehicle driver. The AC motors are preferably high horse power motors. Such motors frequently require water or fluid cooling. The AC motors' cooling fluid is cooled by radiators 140a and 140b. Radiator 140a is cooled by the air flowing through air duct 37a. Radiator 140b mounted on the front of the vehicle is cooled by the wind and vehicle air flow in the same manner as radiators in conventional gas powered vehicles. The radiators are connected to the cooling system of the AC motors by conventional hosing and piping (not shown).

The vehicle has sensors (not shown) connected to the control unit which monitor the vehicle's motion, whether the vehicle is under power, whether sufficient wind is being supplied to the impeller to drive the generators so that sufficient electrical current is being generated to supply the AC motors, the battery banks and/or the compressors' motors as the need maybe, whether sufficient electrical current is being generated, whether the battery banks are sufficiently charged, whether the air tanks are sufficiently charged, whether air is being discharged from the air tanks and whether sufficient air is being discharged from the tanks to the air motor.

When the control unit senses that the vehicle is not moving and is not under power, the control unit monitors the state of the battery bank and the air tanks and charges the battery bank if sufficient current is being generated and supplies compressed air to the air tanks if required and if the battery banks have a sufficient charge. The control unit can be programmed by the vehicle driver so that no systems on the vehicle will be powered by the battery bank other than the AC motors when the battery bank charge drops below a predetermined value.

When the control unit senses the vehicle is moving and under power, the control unit monitors the electrical power output of the generators and the state of the battery bank charge and the air tank charge. If insufficient current is being generated to the power the vehicle, the control unit instructs the air tank valves 17a and 17b to open until a sufficient quantity of air is being released to the air motors to power the generators to where they produce sufficient electrical current for powering the vehicle. The air tanks are recharged by the compressors which draw on current from the battery banks. When excess current for the AC motor is being generated by the generators, the control unit closes down the air tank valves to the point where the generator supplies just the needed current for the AC motors and vehicle accessories. When sufficient wind is flowing through the air ducts and driving the impellers so that the air motors are not needed to drive the generators, the control unit closes the air tank valves. When the wind to the impeller is sufficient to produce excess current for the vehicle's needs the excess current is used to supply electrical charge to the battery bank and the battery bank is drawn upon by the compressors to charge up the air tanks.

When the vehicle is parked, the control unit can be left on to permit the vehicle's battery banks and air tanks to be fully charged by the current produced from the generators driven by natural wind flowing about the vehicle. In one embodiment, if the sensors sense that the generator is not producing sufficient current to operate the vehicle, and the air tanks pressure has dropped below a predetermined value and the battery bank charge has dropped below a predetermined value, the control unit will dedicate all current from the generator and battery bank to the AC motor.

Besides the need for electrical power to power the vehicle, power the compressors' motors and charge the battery banks, electrical power can also be required for air conditioning, vehicle lights, electric brakes, vehicle heating, power windows, power seats, radio and the like if the vehicle is so equipped.

Although the vehicle is shown with two AC motors, generators, air tanks, battery banks and the like, the vehicle can have one or more AC motors, generators, air tanks, battery banks, and the like. The air tanks can be interconnected. The battery banks can be connected in parallel and the like.

The present invention permits the use of electrical vehicles having relatively small battery banks since the energy needed to power the vehicle is supplied both by batteries and compressed air. On a weight to weight basis, more energy can be stored as a compressed gas rather than in a conventional battery. Since electric vehicles are required to carry heavy battery banks which can weigh more than the vehicle it self, a great deal of the energy consumed in an electric vehicle is used to transport the vehicle batteries. The reduction of the battery weight in a vehicle makes the vehicle more efficient.

It should be readily apparent from the foregoing description that an improved system for generating electricity in a vehicle has been illustrated and described. The system advantageously generates electricity for use and storage in the vehicle even when the vehicle speed and wind are both insufficient to drive the generators. Although an embodiment of the invention has been illustrated and described, it is to be understood that various changes and modifications may be made without departing from the spirit and scope of the invention, as defined by the appended claims.

I claim:

1. A system for generating electricity for driving a motor for driving a vehicle, comprising:

compressed air storing means for storing compressed air on said vehicle;

an air powered generator for generating electricity powered by wind, air flow produced by movement of the vehicle, and/or air from said compressed air storing means;

means for storing electrical energy electrically connected to and adapted to receive an electrical charge from said air powered generator;

electric current sensing means for sensing an electric charge produced by the air powered generator connected to the means for discharging air;

air discharging means, connected to said compressed air storing means, for discharging air from said compressed air storing means to power said air powered generator when the wind and the air flow produced by the vehicle movement are insufficient to power said air powered generator to produce electric current to at least a predetermined value;

electric powered means for producing compressed air connected to the compressed air storing means;

air pressure sensing means for sensing an air pressure in the compressed air storing means;

electric charge sensing means for sensing an electric charge in the means for storing electrical energy; and a control unit connected to the air powered generator, the means for storing electrical energy, the compressed air storing means, the electric powered means for producing compressed air, the air pressure sensing means and the electric charge sensing means, the control unit shunting electrical energy to the electric powered means for producing compressed air to charge the compressed air storing means with compressed air when the electrical charge sensed by said electric charge sensing means is at least a first predetermined value and the air pressure sensed by said air pressure sensing means is below a second predetermined value, and the control unit shunting electrical energy from the air powered generator to the means for storing electrical energy to charge the means for storing electrical energy when the air pressure sensed by said air pressure sensing means is at least a third predetermined value and the electric charge sensed by said electric charge sensing means is below a fourth predetermined level.

2. The system according to claim 1 wherein the system includes an electric powered motor for operating the vehicle, the control unit connected to the electric powered motor, the air powered generator being connected to the electric powered motor and to the means for storing electrical energy, the control unit shunting electrical energy to the electric powered motor from the air powered generator and/or from the means for storing electrical energy as required.

3. The system according to claim 1 wherein the means for producing compressed air is connected to the means for storing electrical energy, and the control unit shunting electrical energy from the means for storing electrical energy to the means for producing compressed air as required.

* * * * *